United States Patent

Walls

[11] Patent Number: 5,777,236
[45] Date of Patent: Jul. 7, 1998

[54] METHOD FOR ANALYZING STRUCTURES HAVING DEFORMABLE RIGID ELEMENTS

[75] Inventor: William T. Walls, Gurley, Ala.

[73] Assignee: McDonnell Douglas Corporation, Huntington Beach, Calif.

[21] Appl. No.: 832,311

[22] Filed: Apr. 3, 1997

Related U.S. Application Data

[62] Division of Ser. No. 723,104, Oct. 1, 1996, abandoned.

[51] Int. Cl.[6] .......................... G01M 5/00; G01D 1/16
[52] U.S. Cl. .................................. 73/786; 73/788
[58] Field of Search ........................ 73/760, 786, 787, 73/788, 789, 583, 588

[56] References Cited

U.S. PATENT DOCUMENTS

| | | |
|---|---|---|
| 4,041,017 | 8/1977 | Sloane et al. .......................... 73/579 |
| 4,858,146 | 8/1989 | Shebini . |
| 4,945,492 | 7/1990 | Bennett .......................... 364/512 |
| 5,006,990 | 4/1991 | Ward et al. . |
| 5,195,046 | 3/1993 | Geradi et al. .......................... 364/506 |
| 5,281,454 | 1/1994 | Hanson . |
| 5,388,056 | 2/1995 | Horiuchi et al. .......................... 73/664 |
| 5,424,634 | 6/1995 | Goldfarb et al. . |

OTHER PUBLICATIONS

Copy of paper entitled "Thermally Expanding Rigid Elements", submitted Apr. 29, 1994 at Nastran Users' Collogium, San Diego, CA.

"Nastran® Theoretical Manual" pp. 5.4-1 to 5.4-2, dated Jan. 1981.

*Primary Examiner*—George M. Dombroske
*Assistant Examiner*—Max H. Noori
*Attorney, Agent, or Firm*—Harness Dickey & Pierce P.L.C.

[57] ABSTRACT

A method of analyzing a structure containing a rigid body. The method defines a set of displacement factors to be imposed on a structure model. The method is used for calculating structure stress defining equations including a load vector representing externally applied forces on the structure model. The method modifies the load vector to compensate for rigid body deformation and evaluates stresses on the structure model from data generated from the structure stress defining equations.

13 Claims, 4 Drawing Sheets

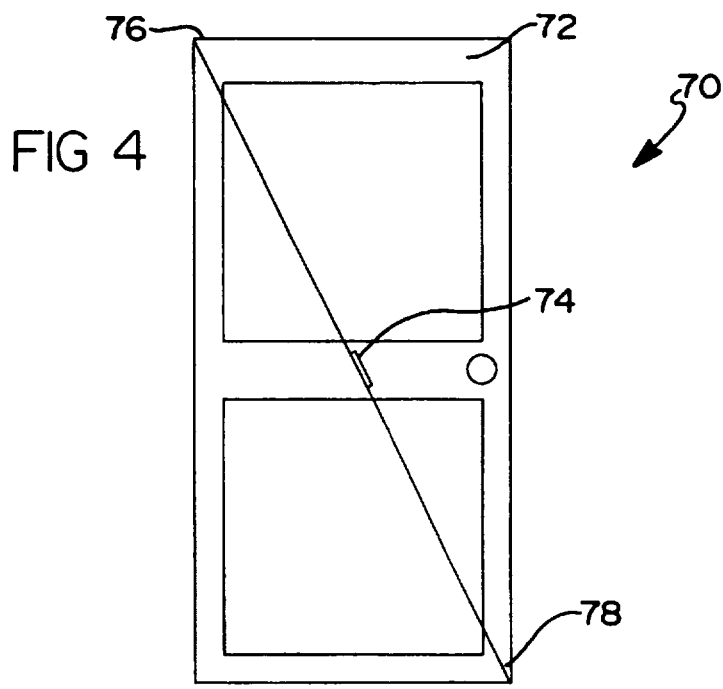
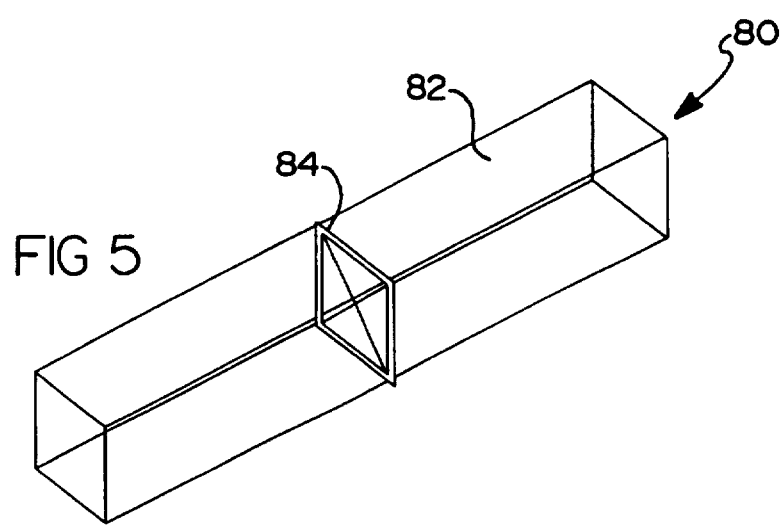
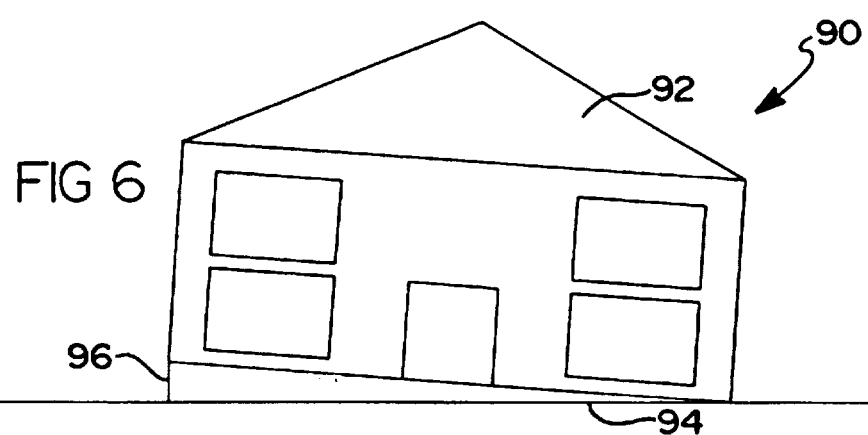

METHOD FOR ANALYZING STRUCTURES HAVING DEFORMABLE RIGID ELEMENTS

This is a division of U.S. patent application Ser. No. 08/723,104, filed Oct. 1, 1996 now abandoned.

BACKGROUND OF THE INVENTION

The present invention relates generally to structural analysis techniques, and more particularly to a finite element analysis method that compensates for expansion of structural rigid elements due to thermal, hydraulic, mechanical or other causes of structural deformation.

Analysis of stresses placed on structures is an important element in structural design and testing. For example, the on-orbit and descent phases of a spacecraft often produce large structural temperature gradients, which result in thermal stresses on the spacecraft structure. Structural stress data also result from aerodynamics, engine thrust, and vibrations. Commercially available finite element analysis programs model the structure and process the various types of load to evaluate the various stresses placed thereon.

The recovery of the structural stress data is often complicated by the presence of multi-point constraints, or rigid elements, located between non-coincident grid points on the model of the structure. Such rigid elements are typically stiff bodies to which other elastic structural components are attached, and are usually employed as a device for avoiding excessively large terms in the stiffness matrix causing it to become "ill conditioned". Conventional finite element coded software programs typically have no capability for compensating for expansion of the structural rigid elements. This lack of compensation introduces artificial constraints into the computer model, thereby causing incorrect structural stresses to be calculated.

A present solution for correcting the above limitation requires replacing the structural rigid elements in the computer generated model with artificially stiff elastic elements having appropriate expansion coefficients and associated defined variables. However, this solution is undesirable as it results in less-than-optimal conditioning of the stiffness matrix generated by the software program. In addition, replacement of the rigid elements with artificially stiff bar elements increases the time required to generate the computer model.

BRIEF DESCRIPTION OF THE DRAWINGS

FIG. 4 is a second structure modeled and analyzed by the system of FIG. 1;

FIG. 5 is a third structure modeled and analyzed by the system of FIG. 1;

FIG. 6 is a fourth structure modeled and analyzed by the system of FIG. 1; and

SUMMARY OF THE INVENTION

The present invention contemplates a method of analyzing the structure of an elastic body containing deformable rigid elements. The method of the present invention provides a more accurate way to account for the expansion of rigid elements in the structure by modifying present structural analysis finite element coded software programs, thereby preventing introduction of artificially high stiffness terms into the model.

In particular, the present invention provides a method of analyzing the characteristics of a structure having a rigid element and includes the step of defining a set of displacement factors to be imposed on a structure model. The method also includes the step of modifying the recovery of displacements to compensate for rigid element deformation. In addition, the method also includes the step of calculating a load vector representing externally applied forces on the structure model. The method modifies the load vector to compensate for rigid element deformation before calculating stresses on the structure model through use of the load vector.

The present invention also provides a system for analyzing characteristics of a structure model having a rigid element that includes a data input for inputting rigid element displacement data into the system. The system also includes a memory that stores structural stress equations. A processor is provided that calculates structural stress utilizing the above stress equations and displacement data. The data output outputs this data, with the data including compensation for deformation of the rigid elements.

DETAILED DESCRIPTION OF THE PREFERRED EMBODIMENT

Figure 1:
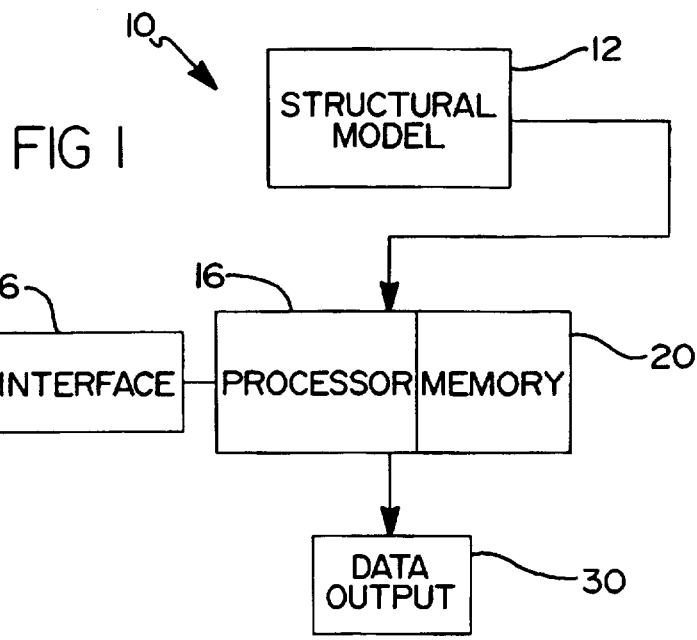
FIG. 1 is a block diagram of a system for analyzing characteristics of a structure having rigid elements.

Referring to FIG. 1, a system according to a preferred embodiment of the present invention is shown generally at 10. The system 10 is programmed to analyze characteristics of a structural model, shown generally at 12, having deformable rigid elements for structure design and modeling purposes. In this context, the word "rigid" denotes an inelastic and normally inextensible element whose deformation is prescribed in purely mathematical terms in the method of the present invention.

Still referring to FIG. 1, a processor 16, which is preferably a conventional personal computer including a Pentium® processor and 32 megabytes of random access memory (RAM) is shown generally at 20. The processor 16 is programmed with a conventional finite element coded software program such as Nastran, CSA/Nastran, Abaqus, or Stardyne structural analysis and modeling as will be discussed below. Such commercially available software programs are coded to analyze structural models to determine the various effects of expansion due to thermal, hydraulic, mechanical or other stress related phenomena on the structure itself. Additional commands including programming changes necessary to implement the methodology of the present invention may be entered into the processor through the operator interface 26, which is typically a computer keyboard. Data generated by the processor through the finite coded element analysis program is output through the data output 30.

While the system of the present invention is described generally above as being implemented in a conventional personal computer having a Pentium® processor, it should be appreciated that other computer hardware may also be utilized, such as a SUN Workstation, CRAY Supercomputer, or any other computer hardware having the processing capability necessary to run commercially available finite element coded programs such as those mentioned above.

Figure 2:
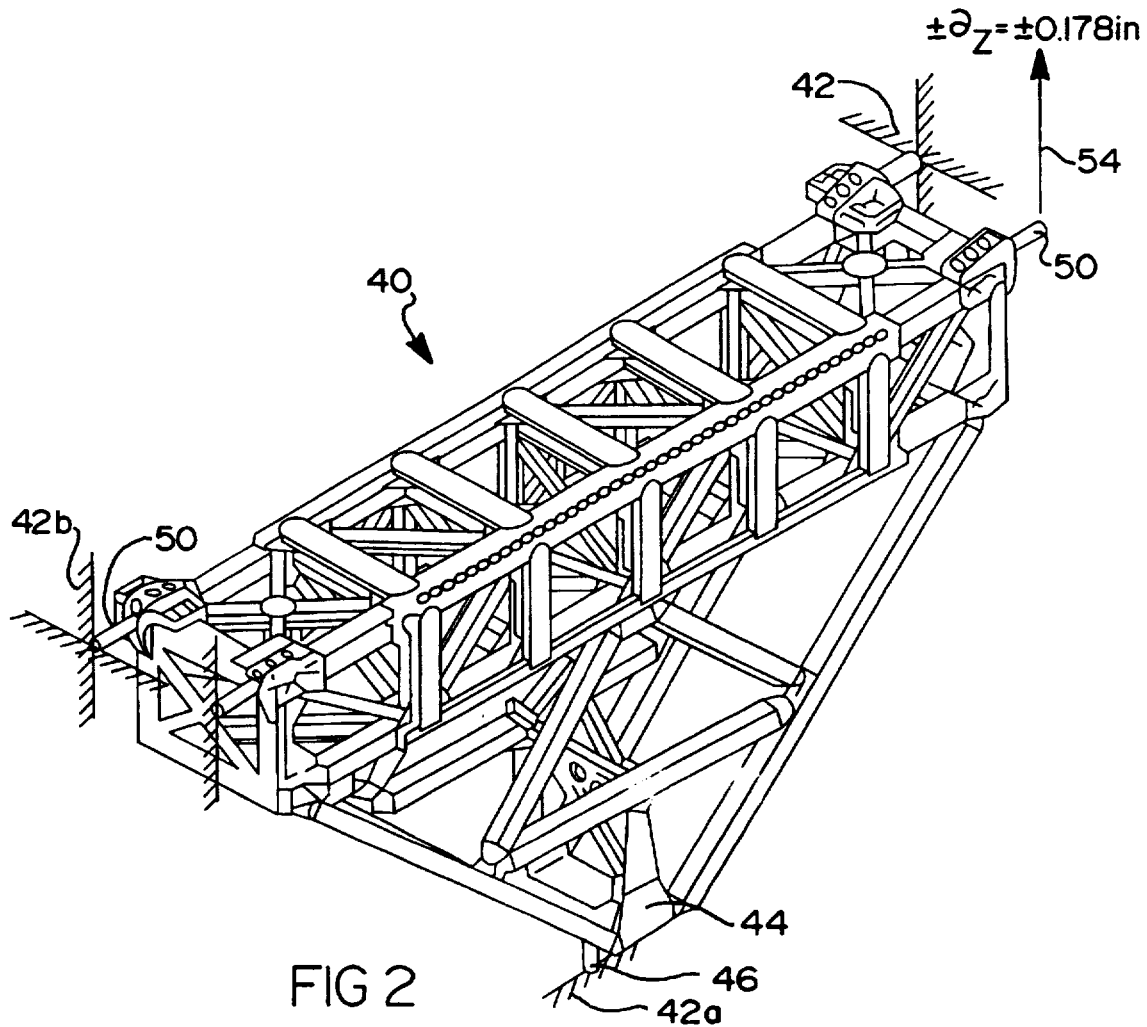
FIG. 2 is a first structure modeled and analyzed by the system of FIG. 1.
Figure 3:
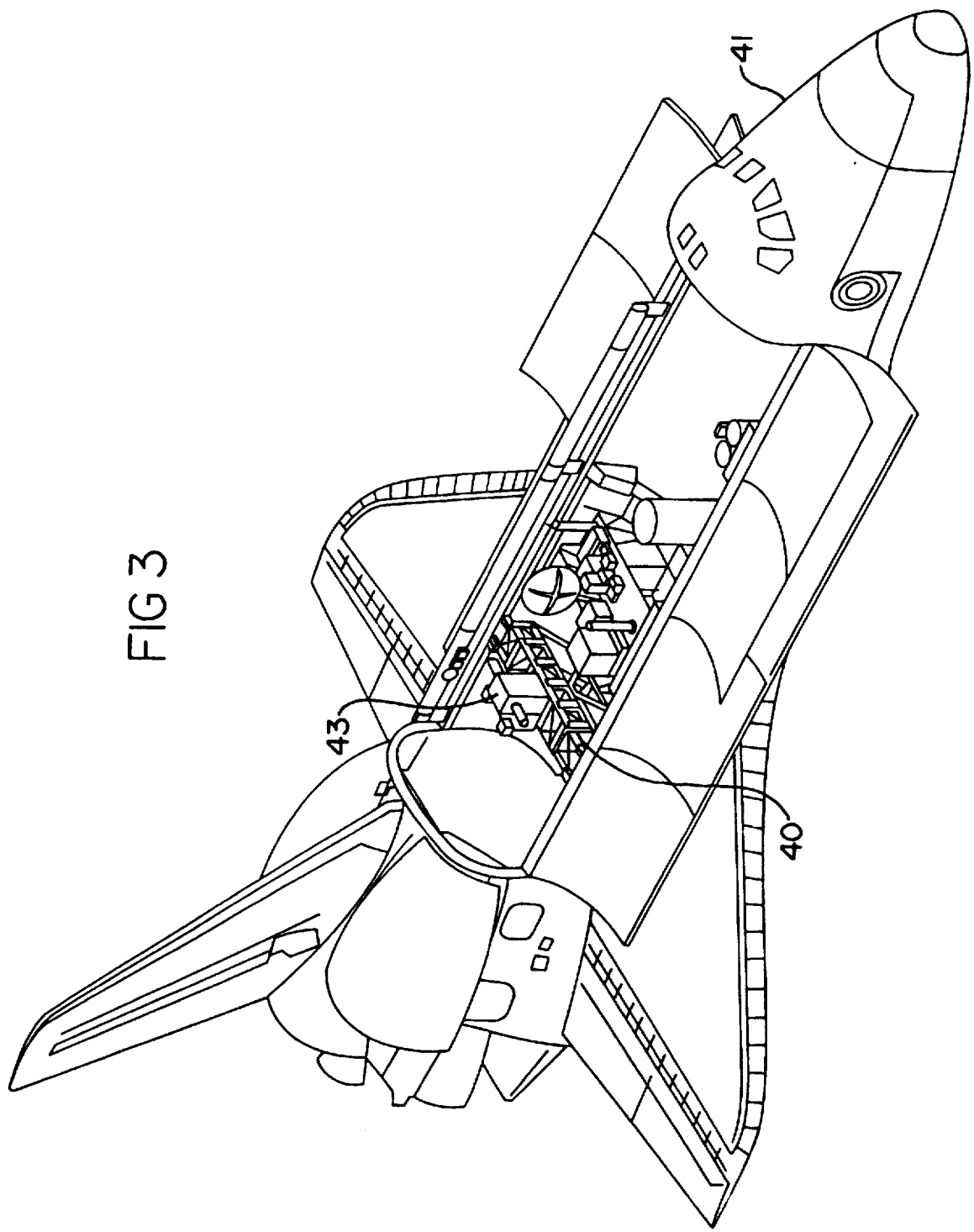
FIG. 3 illustrates the first structure installed in a space shuttle.

Referring to FIGS. 2 and 3, a cargo element of the type that is analyzed by the system 10 is shown generally at 40.

The cargo element is of the type installed within the cargo bay of a space shuttle 41, the walls of which are shown generally at 42a–c in FIG. 2, for carrying various payloads, such as the payload 43, on shuttle missions. The cargo element includes a keel 44 including fittings 46 that latch into the bottom wall of the cargo bay 42a of the shuttle. The fittings are designed to slide up and down in a mounting hole (not shown) in the bottom of the cargo bay. The cargo element also includes trunnions 50 that lock into the sides 42b, 42c of the shuttle for mounting the cargo element to the shuttle. The trunnions 50 introduce a preload into the overall shuttle structure, as the trunnions must be forced into mounting holes (not shown) in the shuttle walls in a friction fit, due to the inherent misalignment of the mounting bores with the trunnions. Therefore, the trunnions must be forced into the mounting bores during installation. A displacement factor represented by $\delta_z$ is shown at 54 to reflect the constraint of the trunnion within the mounting bores in either the plus or minus Z directions.

Present commercially available finite element coded software programs compensate for deformation of the trunnion by requiring that the shuttle walls 42a–c be modeled as an infinitely stiff shuttle when a load is placed on the cargo element 40 in a particular direction, such as that represented by $\delta_z$ at 54. Therefore, the accuracy of the program analysis would be somewhat compromised. As will now be described, the present invention modifies existing analysis programs to enforce relative displacements between various points in the model of the cargo element, rather than enforcing displacements between the cargo element and ground.

Referring to Table I below, definitions of various terms used in equations to follow are given below in Table I:

TABLE I $|R_g|$ - multi-point constraint (MPC) coefficients

These are simply coefficients of the linear constraint equations and are defined by the user to achieve desired results.

$\{U_g\}$ - g-set displacements. The set of all displacements in the structural model. The "g-set" is a finite element code term that simply means everything.

$\{\delta_G\}$=user defined displacements

These are the imposed displacements that compensate for rigid element deformation due to mechanical, hydraulic, thermal or other structural stress-related forces.

$|K|$ - Stiffness matrix

This is formed by assembling the stiffness matrices of all of the finite elements comprising the structure model.

$\{P\}$ - Load vector

This represents any externally applied loads (forces) on the structure model.

$\{q_m\}$ - Vector of constraint forces on $\{u_m\}$

These are forces internal to the structure model resulting from the applied loads.

The theory behind the structural analysis method of the present invention involves a modification of multi-point constraint equations that relate displacement between certain points in the structure such as those used in structural analysis software programs such as NASTRAN. The constraint equations are shown below in Equation 1:

$$|R_g|\{u_g\}=0 \tag{1}$$

Where:

$|R_g|$ - MPC constraint coefficients $\{u_g\}$ - g-set displacements

The modification of the above equations according to the present invention allows for expansion of rigid elements, such as the space shuttle structure 42 shown in FIG. 2, so that Equation 1 above is modified as shown in Equation 2:

$$|R_g|\{u_g\}=\{\delta_G\} \tag{2}$$

Where:

$\{\delta_G\}$=user defined displacement

As each displacement point above has an associated independent (n-set) or dependent (m-set) degree of freedom (DOF) associated therewith, Equation 2 may be partitioned into n-set and m-set degrees of freedom as shown below in Equation 3:

$$|R_n R_m|\left\{\begin{array}{c} u_n \\ u_m \end{array}\right\} = \{\delta_G\} \tag{3}$$

Equation 3 can thereby be solved for the dependent m-set displacements as shown below in Equation 4:

$$\{u_m\} = |R_m|^{-1}\{\delta_G\} + |G_m|\{u_n\} \tag{4}$$

Where:

$$|G_m| = -|R_m|^{-1}|R_n|$$

Where:

$|R_m|^{-1}$ is the inverse of the partition of the dependent multi-point constraint coefficient matrix $\{\delta_G\}$ is the user defined displacement term $|R_n|$=is the partition of the multi-point constraint coefficient matrix corresponding to the dependent set $\{u_n\}$ is the independent set of displacements.

Equation 4 is identical to a standard n-set displacement recovery equation, with the addition of the $\delta_G$ term to compensate for expansion of rigid elements. As independent displacements are functional to the structure itself, Equation 4 is used to recover dependent displacements from the independent displacements.

At this point, the structural problem may be written as shown in Equation 5:

$$\begin{bmatrix} \overline{K_{nn}} & K_{nm} \\ K_{nm}^T & K_{mm} \end{bmatrix}\left\{\begin{array}{c} u_n \\ u_m \end{array}\right\} = \left\{\begin{array}{c} \overline{P_n} \\ P_m \end{array}\right\} \tag{5}$$

Where;

$|K|$-Stiffness matrix $\{P\}$-Load vector

In Equation 5 above, each of the four terms in the stiffness matrix represents a partition of the stiffness matrix, with $\overline{K_{nn}}$ representing a partition of the stiffness matrix containing the independent degrees of freedom, $K_{nm}$ representing the couplings between the dependent and independent degrees of freedom. $K_{nm}^T$ representing the transpose of $K_{nm}$, and $K_{mm}$ representing the partition of the global stiffness matrix containing dependent degrees of freedom. Therefore, Equation 5 equates to: stiffness×displacement=force. The bars over the symbols above in Equation 5 indicate that these particular arrays will be replaced in the reduction process.

As the multi-point constraint Equation 4 is incorporated into Equation 5, Equation 6 is derived as shown below:

$$\begin{bmatrix} \overline{K_{nn}} & K_{nm} & G_m^T \\ K_{nm}^T & K_{mm} & -I \\ G_m & -I & 0 \end{bmatrix} \begin{Bmatrix} u_n \\ u_m \\ q_m^m \end{Bmatrix} = \begin{Bmatrix} \overline{P_n} \\ P_m \\ Y_m \end{Bmatrix} \quad (6)$$

Where:

$\{Y_m\} = -|R_m|^{-1}\{\delta_G\}$ $\{q_m^m\}$ - Vector of constraint forces on $\{u_m\}$ Subsequently, $q_m^m$ and $u_m$ are eliminated to transform the equation into the same form as Equation 5. The elimination of these terms results in the following Equation 7 given below:

$$|\overline{K_{nn}} + K_{nm}G_m + G_m^T K_{nm}^T + G_m^T K_{mm}G_m|\{u_n\} = \{\overline{P_n}\} + |G_m^T|\{P_m\} + |K_{nm}|\{Y_m\} + |G_m^T||K_{mm}|\{Y_m\} \quad (7)$$

From Equation 7, a reduced stiffness matrix and load vector may be derived, as shown below in Equations 8 and 9 respectively:

$$|K_{nn}| = |\overline{K_{nn}} + K_{nm}G_m + G_m^T K_{nm}^T + G_m^T K_{mm}G_m| \quad (8)$$

and $$|P_n| = \{\overline{P_n}\} + |G_m^T|\{P_m\} + |K_{nm}|\{Y_m\} + |G_m^T||K_{mm}|\{Y_m\} \quad (9)$$

$|P_n|$ is the load vector reduced to the independent set $\{\overline{P_n}\}$ is the partition of the load vector corresponding to the independent set $|G_m^T|$ is the transpose of $|G_m|$ as defined in Equation 4.

$\{P_m\}$ is the partition of the load vector corresponding to the dependent set $|K_{nm}|$ represents the couplings between the independent and dependent degrees of freedom $\{Y_m\}$ is defined in Equation 6.

$|K_{mm}|$ is the partition of the global stiffness matrix pertaining to dependent degrees of freedom Equation 8 is identical to the equation presented in the commercially available COSMIC/NASTRAN theoretical manual. However, Equation 9 contains two additional terms involving $Y_m$, to compensate for expansion or other deformation of the rigid structure. When $\delta_G$ is zero, Equations 4 and 9 above degenerate to the standard equations with no expansion/deformation compensation being introduced.

It is contemplated that the above programming modifications be made to existing software packages through programming modifications made in FORTRAN, or any other conventional computer programming language used to implement the aforementioned programs, in a manner well known to those skilled in the art.

FIGS. 4 through 6 illustrate structures capable of being modeled and evaluated by finite element coded software programs such as those mentioned above, as modified by the structural analysis method of the present invention.

FIG. 4 illustrates a structure, shown generally at 70, including a door 72 having a turnbuckle 74 connected to opposing diagonal ends 76, 78 of the door. Conventional finite element coded software modeling programs will enforce displacements relative to ground at each of the corners of the door 72 rather than applying enforced displacement relative to each of the corners of the door 72. The system and method of the present invention enforce relative displacement between the corners 76, 78, thereby improving structural modeling accuracy.

FIG. 5 shows a system 80 including a structure 82 having a constricting belt 84 cinched around the structure capable of being variably tightened around the structure. Rather than determining overall displacement being enforced around the structure, as with conventional modeling programs, the present invention allows specification of the amount of contraction on each of the four sides of the structure. Therefore, if the structure is not uniformly stiff around its perimeter, the present invention allows the program operator to calculate the different stresses on each of the four sides, thereby resulting in more accurate structure modeling and analysis.

FIG. 6 illustrates a system generally at 90 including a building 92 being jacked from an elastic foundation 94 by a hydraulic jack 96. Conventional modeling equations would model the foundation as being infinitely stiff. However, the present invention, through the introduction of the $\delta_G$ term, factors the inherent elasticity of the foundation into the equation, thereby allowing the forced displacement between two elastic points to be applied to the model. This increases accuracy of the system modeling and analysis.

Figure 7:
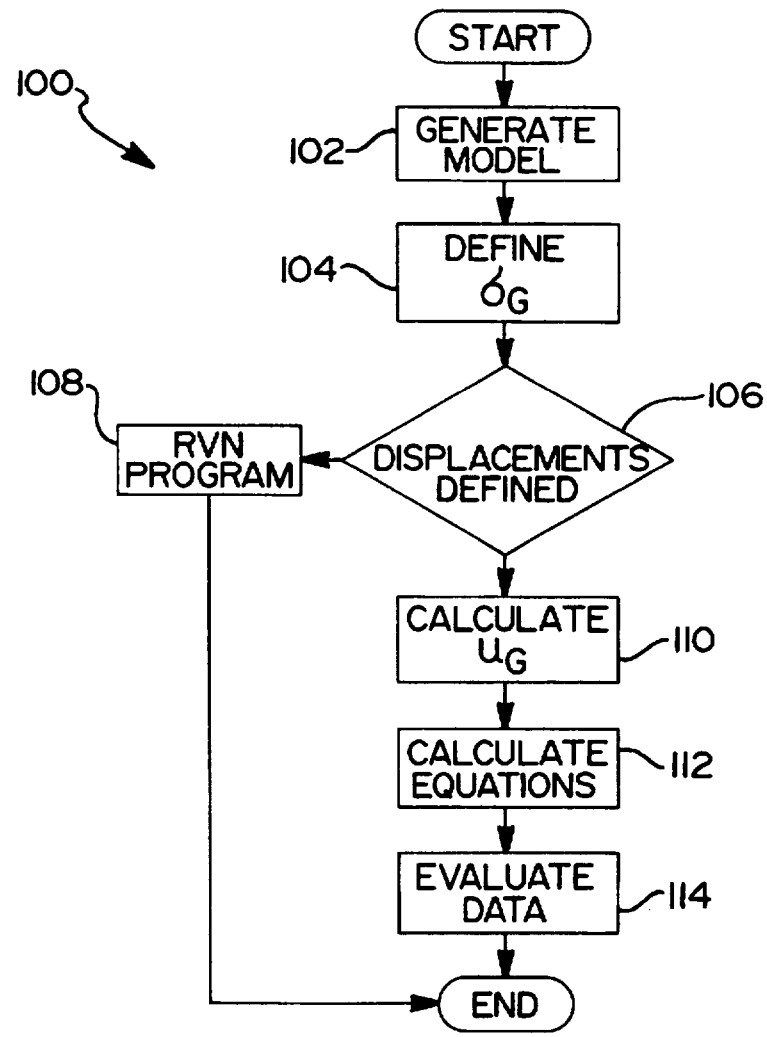
FIG. 7 is a flow diagram of the methodology programmed into the system of FIG. 1 for analyzing structural characteristics of structures such as those shown in FIGS. 3–6.

FIG. 7 is a flow diagram shown at 100 illustrating the methodology of the present invention. At step 102, a model of the structure being analyzed is generated. At step 104, the user defines the rigid element deformations $\delta_G$. At step 106, the system determines if the system user has defined displacements ($\delta_G$) to compensate for rigid element deformation in the structure due to mechanical, hydraulic, thermal or other structure stress related forces. If no displacements are defined, the program proceeds to step 108, and does not factor in the rigid element deformation. If the system user has defined such displacements, at step 110, $u_g$ is calculated, including correction for the imposed displacements $\delta_G$. After $u_g$ has been calculated, the modified stress defining equations are subsequently calculated at step 112. The corrected stress defining equations include the load vector P and the modified displacements included in $u_g$. At step 114, the data is evaluated using the stress defining equations calculated at step 112. After this data is evaluated at step 116, it is used for structural modeling and analysis purposes as is known in the art.

Upon reading the foregoing detailed description, it should be appreciated that the system and method of the present invention enable one skilled in the art to modify an existing finite element coded structural analysis program to compensate for deformation of structural rigid elements. Thus, the present invention permits more accurate computer modeling of structures with only minimal software programming modification.

While the above detailed description describes the preferred embodiment of the present invention, the invention is susceptible to modification, variation and alteration without deviating from the scope and fair meaning of the subjoined claims.

What is claimed is:

1. A method for analyzing a structure having a deformable rigid element, the method comprising the steps of:

defining a set of displacement factors to be imposed on a structure model;

calculating a set of structure stress defining equations based on said set of displacement factors, wherein said structure stress defining equations include:

provision for calculating a load vector representing externally applied forces applied to the structure model;

provision for inputting a value of a known magnitude of rigid element deformation experienced by said structure before said load vector is applied;

provision for modifying the load vector to compensate for said known magnitude of rigid element deformation experienced by said structure before calculating stresses on the structure model resulting from said load vector;

applying the set of displacement factors to the structure stress defining equations;

outputting data generated from said step of applying the set of displacement factors to the structure stress defining equations;

evaluating stresses on the structure model; and wherein said structure stress defining equations include a formula:

$$\{u_m\}=|R_m|^{-1}\{\delta_G\}+|G_m|\{u_n\} \tag{4}$$

where:

$|R_m|^{-1}$ is the inverse of a partition of a dependent multi-point constraint co-efficient matrix;

$\{\delta_G\}$ is a user defined displacement term;

$|R_n|=$ is the partition of the multi-point constraint coefficient matrix; and $\{u_n\}$ is an independent set of displacements.

2. The method of claim 1, wherein the step of modifying said load vector comprises the step of introducing an expansion co-efficient into the load vector.

3. The method of claim 1, wherein said step of modifying said set of structures stress defining equations comprises the step of modifying said set of structure stress defining equations to compensate for a mechanical expansion of the rigid element.

4. The method of claim 1, wherein said step of modifying said set of structure stress defining equations comprises the step of modifying said equations to compensate for hydraulic expansion of the rigid element.

5. A method for analyzing a structure having a deformable rigid element, said method comprising the steps of:

defining a set of displacement factors to be imposed on a structure model;

calculating a set of structure stress defining equations based on said set of displacement factors to account for the deformation of said rigid element, wherein said structure stress defining equations include the steps of accounting for a known magnitude of deformation of the rigid element, and calculating a load vector representing externally applied forces applied to the structure model;

applying a set of displacement factors to the structure stress defining equations;

evaluating stresses on the structure model; and wherein said structure stress defining equations include the formula:

$$\{u_m\}=|R_m|^{-1}\{\delta_G\}+|G_m|\{u_n\} \tag{4}$$

where:

$|R_m|^{-1}$ is the inverse of a partition of a dependent multipoint constraint co-efficient matrix;

$\{\delta_G\}$ is a user defined displacement term;

$|R_n|=$ is the partition of the multi-point constraint coefficient matrix; and $\{u_n\}$ is an independent set of displacements.

6. The method of claim 5, further comprising the step of:

outputting data generated from said step of applying the set of displacement factors to the structure stress defining equations prior to said step of evaluating stresses on the structure model.

7. The method of claim 5, further comprising the step of modifying said load vector to compensate for expansion of the rigid element.

8. The method of claim 7, further comprising the step of modifying said load vector by introducing an expansion co-efficient into the load vector.

9. The method of claim 5, further comprising the step of modifying said set of structure stress defining equations to compensate for mechanical expansion of said rigid element.

10. The method of claim 5, further comprising the step of modifying said set of structure stress defining equations to compensate for hydraulic expansion of the rigid element.

11. A method for analyzing a structure having a deformable rigid element, said method comprising the steps of:

defining a set of displacement factors to be imposed on a structure model;

providing a data input for inputting said displacement factors to a processor;

using a memory to store a plurality of structure stress defining equations based on said set of displacement factors;

providing said structure stress defining equations with a provision for defining a set of displacement factors to be imposed on a structure model, a provision for calculating a load vector representing externally applied forces applied to the structure model, a provision for inputting a value of a known magnitude of deformation of said rigid element before applying said load vector to said structure model and a provision for modifying the load vector to compensate for known rigid element deformation experienced by said structure model before calculating stresses on the structure model resulting from said load vector;

using a processor to model the structure and to process said structure displacement data through said plurality of structure stress defining equations;

outputting structure displacement data generated by said processor for structural analysis and modeling; and wherein said structure stress defining equations include the formula:

$$\{u_m\}=|R_m|^{-1}\{\delta_G\}+|G_m|\{u_n\} \tag{4}$$

where:

$|R_m|^{-1}$ is the inverse of a partition of a dependent multi-point constraint co-efficient matrix;

$\{\delta_G\}$ is a user defined displacement term;

$|R_n|=$ is the partition of the multi-point constraint coefficient matrix; and $\{u_n\}$ is an independent set of displacements.

12. The method of claim 11, wherein said structure stress defining equations include the step of compensating for mechanical expansion of the rigid element.

13. The method of claim 11, wherein said structure stress defining equations comprise the step of compensating for hydraulic expansion of the rigid element.

* * * * *